UNITED STATES PATENT OFFICE.

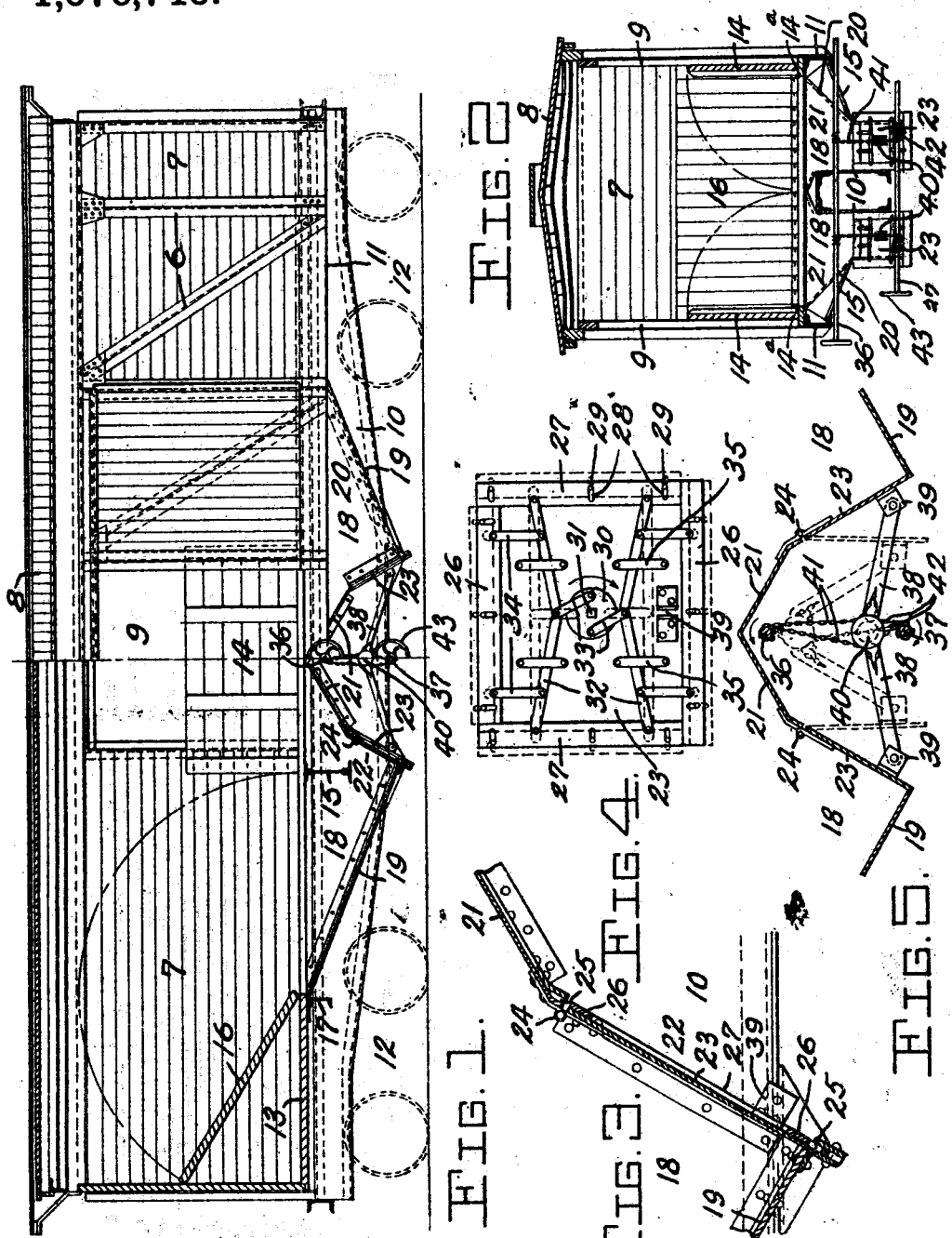

JAMES M. COLEMAN, OF MONTREAL, QUEBEC, CANADA.

CONVERTIBLE CAR.

1,076,746.   Specification of Letters Patent.   Patented Oct. 28, 1913.

Application filed April 22, 1910. Serial No. 557,018.

*To all whom it may concern:*

Be it known that I, JAMES M. COLEMAN, of the city of Montreal, in the Province of Quebec and Dominion of Canada, have invented certain new and useful Improvements in Convertible Cars, of which the following is a full, clear, and exact description.

This invention relates to improvements in convertible cars, and the object is to provide a car which may be used in one form as a flat floored car for carrying miscellaneous freight, and may be quickly and easily converted into a hopper bottom car for carrying grain, coal or the like.

A further object is to provide a hopper bottom car which may be quickly and easily dumped into a small area, such as the chutes of a grain elevator.

A still further object is to provide means for preventing leakage of grain from the car during transit.

To accomplish these objects, I provide a car having the floor thereof formed in sections, covering permanent hoppers. When the car is used as a general purpose freight car, the floor remains level but when used as a grain or coal car, the floor sections over the hoppers are raised to form the car into a hopper bottom car. The floor comprises two central sections divided longitudinally of the car and adapted to be raised at the sides to cover the doorways. An intermediate section at each end of the central sections is adapted to be raised at the ends of the car to form continuations of the hopper bottoms, and a stationary section at each end of the car over the trucks. Outwardly swinging doors are hinged at the top to the adjacent ends of the hoppers and are opened and closed by a suitable mechanism. Movable sealing plates are mounted at the edges of the doors to prevent any grain leakage during transit.

In the drawings which illustrate my invention:—Figure 1 is a view of a car showing on the left a vertical longitudinal section and on the right a side elevation. Fig. 2 is a vertical cross section at the center of the car. Fig. 3 is an enlarged detail view showing the connection of the hopper doors to the hopper. Fig. 4 is a plan view of the hopper door and sealing device therefor. Fig. 5 is a detail view of the hopper door opening and closing gear.

Referring to the drawings, 6 designates a suitable type of framework for the body of a car and 7 the sheathing which is made to present a perfectly smooth interior surface for the car. The body is provided with a suitable roof 8 and doorways 9. The car body is mounted on longitudinal center sills 10 and side sills 11, and is provided with trucks designated 12. At each end of the car, the portion 13 of the floor over the trucks is stationary. The floor at the center of the car is formed by a pair of doors 14 which divide longitudinally at the center and are hinged at the sides of the car, as indicated at 14ᵃ. These doors 14 extend beyond the sides of the doorways and are supported at their ends on the transoms or cross bearers 15. The floor at each end of the doors 14, between said doors and the stationary floors, is formed of a single intermediate section 16 extending the full width of the car. These intermediate sections are supported at their inner ends on the transoms 15 and are supported at their outer ends on the transoms 17, which latter transoms also support the inner ends of the stationary floor sections 13. The sections 16 are preferably hinged to the stationary sections 13. Below the floor, a plurality of stationary hoppers 18 are located on each side of the center sills. These hoppers are each composed of bottom plates 19, sloping downwardly from the transoms 17 toward the center of the car. The inner sides of the hopper are formed by the webs of the center sills, and the outer sides are formed by plates 20 sloping downwardly from the side sills 11 toward the center sills 10. The ends of the hoppers are formed by plates 21 diverging from the center of the car, and at the bottom of each hopper an opening or mouth 22 is formed between the end plate 21 and the bottom plate 19. Hopper doors 23 are hinged to the end plates of the hopper by the hinges 24, which may be located either on the inside or outside of the doors. Surrounding the mouth of the hopper, is an external recess 25, within which top and bottom latch plates 26 and side latch plates 27 are adapted to slide in order to seal the hopper doors tightly against leakage of grain, or other material, in transit. The latch plates are located at the periphery of the hopper doors and are provided with slots 28 within which are located studs or bolts 29 secured to the doors. These sealing plates are operated from a central disk 30 provided with a square hub 31 upon which a wrench may be used for throwing the latch plates into and out of the recess 25. Toggle levers 32 are secured to the side plates 27 and are connected at their point of junction with links 33 attached to the disk 30, one on each side of the square hub. Links 34 are secured to the levers 32 at one end, and at the opposite end are secured to the top and bottom latch plates. The levers 32 operate in guides 35 to prevent buckling of said levers. It will be obvious that when the hub 30 is turned by means of a wrench, or any other suitable instrument, in the direction of the arrow, that the levers 32 and links 34 will draw the top and bottom and side latch plates toward the center of the door, said plates sliding on the studs 29 within the slots 28. Similarly, when the disk is turned in the opposite direction, the latch plates will be forced outwardly beyond the periphery of the door proper.

The hopper doors may be swung inwardly or outwardly on their hinges by any suitable mechanism, and may be operated either independently or simultaneously. In Fig. 5, I have shown one form of operating gear for the hopper doors consisting of an upper transverse shaft 36 and a lower transverse shaft 37 provided with hand wheels 43. Lever rods 38 are secured to lugs or brackets 39 on the hopper doors 23, and at their free ends are attached to chains which pass around a loose sheave 40 between the upper and lower shafts 36 and 37. Door opening chains 41 secured to the lever rods 38 pass around the bottom of the sheave and upwardly to the shaft 36, while door closing chains 42 extend from the lever rods 38 around the upper side of the sheave and downwardly to the operating shaft 37. When the shaft 36 is turned in the direction of the arrow at the top in Fig. 5, the sheave 40 will be carried upwardly and with it the lever rods 38, thus drawing the doors 23 away from the hopper. To close the doors, the shaft 37 is turned in the direction of the arrow at the bottom of Fig. 5, and the sheave 40 is drawn downwardly, thus forcing the lever rods 38 against the doors and closing them. Any suitable locking or unlocking devices, such as a pawl and ratchet, may be provided for the shafts 36 and 37.

In operation, when the car is to be used as an ordinary box car for carrying miscellaneous freight, all the floor sections rest on the transoms and form a continuous horizontal floor over the hoppers the full length and width of the car. When the car is to be used for carrying grain or the like, the two floor doors 14 are raised, as shown in Figs. 1 and 2, to form an inner covering and support for the car doors. The intermediate floor sections 15 are lifted and placed on an incline at each end of the car, so as to cover the stationary floor sections, the upper edges of the sections resting on the end walls of the car, so that these sections form continuations of the bottom plates of the hoppers. The car is thus converted into a hopper car having no level floor off which the grain will have to be shoveled to complete the emptying of the car. The interior surface of the car walls is smooth, and presents no ledges for the lodgment of grain. To close the hopper doors ready for filling the car, the transverse shaft 37 is operated by means of the hand wheel 43 in the direction of the arrow shown at the bottom of Fig. 5, when the sheave 40 will be drawn downwardly and the lever rods 38 will force the hopper doors 23 into position. When the doors are in place, the disk 30 on each door is turned by means of the hub 31 so that the latch plates are forced outwardly into the recess 25, to thus completely cover the periphery of the door and form a seal against leakage of grain or other material. The shaft 37 may be also locked in any suitable manner. When the car is to be unloaded in a grain elevator or the like, the latch plates are withdrawn from the recess, the shaft 37 is unlocked, and the transverse shaft 36 is operated in the direction shown at the top of Fig. 5, so that the opening chains carry the sheave 40 with the lever rods 38 upwardly and thus withdraw the doors 23 from the hopper mouth. The car will thus completely empty itself within a very limited area and within a very short period of time.

While I have shown the preferred form of construction it will be obvious that many modifications may be made in the details of construction and arrangement without departing from the spirit of my invention.

Having thus described my invention, what I claim is:—

1. In a car of the character described, a hopper bottom, an outwardly swinging door therefor, said hopper having a recess surrounding the door opening adjacent the edges thereof, means for opening and closing said door, latch plates slidably secured adjacent the periphery of said door, toggle mechanism arranged to slide said plates simultaneously into the recess surrounding the door opening.

2. In a car of the character described, a hopper bottom, an outwardly swinging door therefor, said hopper having a recess surrounding the door opening adjacent the edges thereof, means for opening and closing said door, latch plates slidably mounted at the edges of the door, toggle levers connecting the plates on two opposite edges of the door, links connecting the plates on the two remaining edges of the door with said toggle levers, a revoluble disk and links connecting said disk with the joints of the toggle levers, whereby the plates will be simultaneously forced into the recess surrounding the door opening on the rotation of the disk.

In witness whereof I have hereunto set my hand in the presence of two witnesses.

JAMES M. COLEMAN.

Witnesses:
 STUART R. W. ALLEN,
 E. R. MCKENZIE.